United States Patent
Iwashimizu et al.

(10) Patent No.: US 11,163,150 B2
(45) Date of Patent: Nov. 2, 2021

(54) ADAPTIVE OPTICAL SYSTEM AND ADAPTIVE OPTICAL METHOD COMPRISING A CONTROLLER WITH ZERNIKE COEFFICIENTS AND ZERNIKE POLUNOMIAL CALCULATION

(71) Applicants: MITSUBISHI HEAVY INDUSTRIES, LTD., Tokyo (JP); RIKEN, Saitama (JP)

(72) Inventors: Masashi Iwashimizu, Tokyo (JP); Hiroyuki Daigo, Tokyo (JP); Shingo Nishikata, Tokyo (JP); Kazunori Masukawa, Tokyo (JP); Atsushi Ochiai, Tokyo (JP); Toshikazu Ebisuzaki, Saitama (JP); Satoshi Wada, Saitama (JP); Yoshiyuki Takizawa, Saitama (JP)

(73) Assignees: MITSUBISHI HEAVY INDUSTRIES, LTD., Tokyo (JP); RIKEN, Saitama (JP)

( * ) Notice: Subject to any disclaimer, the term of this patent is extended or adjusted under 35 U.S.C. 154(b) by 108 days.

(21) Appl. No.: 16/629,105

(22) PCT Filed: Apr. 25, 2018

(86) PCT No.: PCT/JP2018/016803
§ 371 (c)(1),
(2) Date: Jan. 7, 2020

(87) PCT Pub. No.: WO2019/021558
PCT Pub. Date: Jan. 31, 2019

(65) Prior Publication Data
US 2020/0209610 A1  Jul. 2, 2020

(30) Foreign Application Priority Data
Jul. 27, 2017 (JP) .............................. JP2017-145310

(51) Int. Cl.
*G02B 26/06* (2006.01)
*G01J 9/00* (2006.01)
(Continued)

(52) U.S. Cl.
CPC ................ *G02B 26/06* (2013.01); *G01J 9/00* (2013.01); *G02B 26/0816* (2013.01); *G01J 2009/002* (2013.01); *H01S 3/10* (2013.01)

(58) Field of Classification Search
CPC ...... G01J 2009/002; G01J 9/00; G02B 26/06; G02B 26/0816; G02B 26/0825
(Continued)

(56) References Cited

U.S. PATENT DOCUMENTS 4,996,412 A  2/1991  Anafi et al.
9,006,633 B2 *  4/2015  Tofsted .................. H04N 5/357
                                                         250/208.1
(Continued)

FOREIGN PATENT DOCUMENTS

| JP | 2016-36588 | 3/2016 |
| JP | 2016-42550 | 3/2016 |
| WO | 2014/041839 | 3/2014 |

OTHER PUBLICATIONS

Extended European Search Report dated Jun. 16, 2020 in corresponding European Patent Application No. 18838652.8.
(Continued)

*Primary Examiner* — Que Tan Le
(74) *Attorney, Agent, or Firm* — Wenderoth, Lind & Ponack, L.L.P.

(57) ABSTRACT

A driving optical system is used to observe a disturbance of a wavefront of reference light received from a target and generate a wavefront in a conjugate relationship with the wavefront. A plurality of control signals are generated on a basis of a plurality of Zernike coefficients calculated as a
(Continued)

Zernike polynomial which approximates the wavefront disturbance in order to respectively drive a plurality of deformable mirrors included in the driving optical system. An adaptive optical system is provided which can optically compensate a wavefront disturbance derived from an atmospheric fluctuation even in a case of radiating laser light to a target moving at a high speed.

8 Claims, 7 Drawing Sheets

(51) Int. Cl.
*G02B 26/08* (2006.01)
*H01S 3/10* (2006.01)

(58) Field of Classification Search
USPC .............................................. 250/209.1, 216
See application file for complete search history.

(56) References Cited

U.S. PATENT DOCUMENTS

2008/0042042 A1 2/2008 King et al.
2011/0228386 A1 9/2011 King et al.

OTHER PUBLICATIONS

International Search Report dated Jul. 17, 2018 in International (PCT) Application No. PCT/JP2018/016803.
le;2qEnglish translation of the International Preliminary Report on Patentability and Written Opinion of the International Searching Authority dated Feb. 6, 2020 in International (PCT) Application No. PCT/JP2018/016803.

* cited by examiner

ADAPTIVE OPTICAL SYSTEM AND ADAPTIVE OPTICAL METHOD COMPRISING A CONTROLLER WITH ZERNIKE COEFFICIENTS AND ZERNIKE POLUNOMIAL CALCULATION

TECHNICAL FIELD

The present invention relates to an adaptive optical system and an adaptive optical method and for example relates to a technology of compensating a wavefront disturbance derived from an atmospheric fluctuation.

BACKGROUND ART

There is a case where a wavefront of light is disturbed by an atmosphere fluctuation when the light propagates through the atmosphere. In astronomical observation, there are often cases where a resolution that a telescope originally has is not realized enough due to such phenomenon and an observed image is blurred.

In order to solve such problems, a technology called adaptive optics is developed. This is a technology of observing a wavefront of light propagating through an atmosphere by use of a wavefront sensor and compensating the wavefront by use of a deformable mirror adjusted in accordance with a result of this observation.

As an application example of the adaptive optics technology, a laser guide star adaptive optics device of the National Astronomical Observatory of Japan Subaru Telescope is known.

Conventionally, the adaptive optics technology was mainly adapted to observations of targets which hardly move, such as celestial bodies. However, in recent years, applications in that radiation of laser light from inside the atmosphere to a moving object is required, such as optical space communication to a moving body, space debris removal work or the like, are proposed and researched.

When laser light propagates through the atmosphere, a wavefront of the laser light is disturbed by a fluctuation of the atmosphere. As a result, there are cases where the laser light is bent, diffused or the like. In order to prevent such phenomenon, it is effective to radiate the laser light, of which the wavefront is corrected in advance, to the target. In addition, there are also problems caused by moving of the target.

In connection with the above, Patent Literature 1 (Japanese Patent Publication 2016-42550 A) discloses a laser radiation device. This laser radiation device radiates laser light to a moving body. This laser radiation device is provided with a first deformable mirror, a second deformable mirror and a laser radiation section. Here, the first deformable mirror performs a correction of a focal position on a basis of a change of distance between the moving body and the laser radiation device. The second deformable mirror performs a correction on a basis of a fluctuation of an atmosphere. The laser radiation section radiates the laser light to the moving body via the first deformable mirror and the second deformable mirror.

CITATION LIST

Patent Literature

[Patent Literature 1] Japanese Patent Publication 2016-42550 A

SUMMARY OF THE INVENTION

An adaptive optical system is provided, which can optically compensate a wavefront disturbance derived from an atmosphere fluctuation even in a case of radiating laser light to a target moving at a high speed. Other problems to be solved and new characteristics will be clear from the description of the present specification and the attached drawings.

An adaptive optical system in an embodiment is provided with a light source, an optical system, a wavefront sensor and a controller. The wavefront sensor observes a wavefront of reference light received from a target and generates a wavefront observation information signal indicating an observation result of the wavefront. The controller calculates a Zernike polynomial on a basis of the wavefront observation information signal. The controller generates m control signals (m is an integer) on a basis of Zernike coefficients up to n-th order in the calculated Zernike polynomial, wherein n is an integer equal to or more than three and m satisfies $n \geq m \geq 3$. The plurality of control signals may include a first controls signal, a second control signal and a third control signal. The first control signal is generated on a basis of a first order Zernike coefficient, among the plurality of Zernike coefficients, which indicates an inclination component of the disturbance of the wavefront. The second control signal is generated on a basis of a second order Zernike coefficient, among the plurality of Zernike coefficients, which indicates a focus shift component of the disturbance of the wavefront. The third control signal may be generated on a basis of a third order Zernike coefficient, among the plurality of Zernike coefficients, which indicates a third coefficient of the disturbance of the wavefront. The light source generates laser light. The optical system receives the laser light from the light source to optically process so that the laser light has a conjugate wavefront to the wavefront of the reference light in response to m control signals from the controller and emits the processed laser light to the specific target. The optical system includes a driving optical system and the driving optical system may be provided with a first driving mirror, a second driving mirror and a third driving mirror. For example, the controller drives the first driving mirror by the first control signal, the second driving mirror by the second control signal and the third driving mirror by the third control signal.

An adaptive optical method in an embodiment comprises performing observation of a wavefront of reference light reached from a target, generating a wavefront observation information signal indicating a result of the observation, calculating a Zernike polynomial on a basis of the wavefront observation information signal, generating m control signals (m is an integer) on a basis of Zernike coefficients up to n-th order in the calculated Zernike polynomial, wherein n is an integer equal to or more than three and m satisfies $n \geq m \geq 3$, generating laser light, optically processing the laser light in response to the m control signals from the controller so that the laser light has a conjugate wavefront to a wavefront of the reference light and emitting the processed laser light to the specific target.

According to the previously described embodiment, a wavefront disturbance derived from an atmosphere fluctuation can be optically compensated even in a case of radiating laser light to a target moving at a high speed.

DESCRIPTION OF EMBODIMENTS

By referring to attached drawings, an embodiment to carry out an adaptive optical system and an adaptive optical method according to the present invention will be explained in the following.

At first, for a better understanding of the present invention, conventional arts will be explained. In Patent Literature 1 (Japanese Patent Publication 2016-42550 A), a wavefront correction is performed to radiated laser light by using a deformable mirror when radiating the laser to a moving body. In addition, by performing a correction of focus in accordance with a change of distance to the target by use of another deformable mirror, a coexistence of wavefront correction and focal correction is proposed.

However, Patent Literature 1 does not present any effective solution to simultaneously realize a high speed correction, a high resolution and a large correction amount, a coexistence of a high precision tracking of a target position and adaptive optics and the like, which are required in a case where a moving speed of the target is increased.

First Embodiment

Figure 1A:
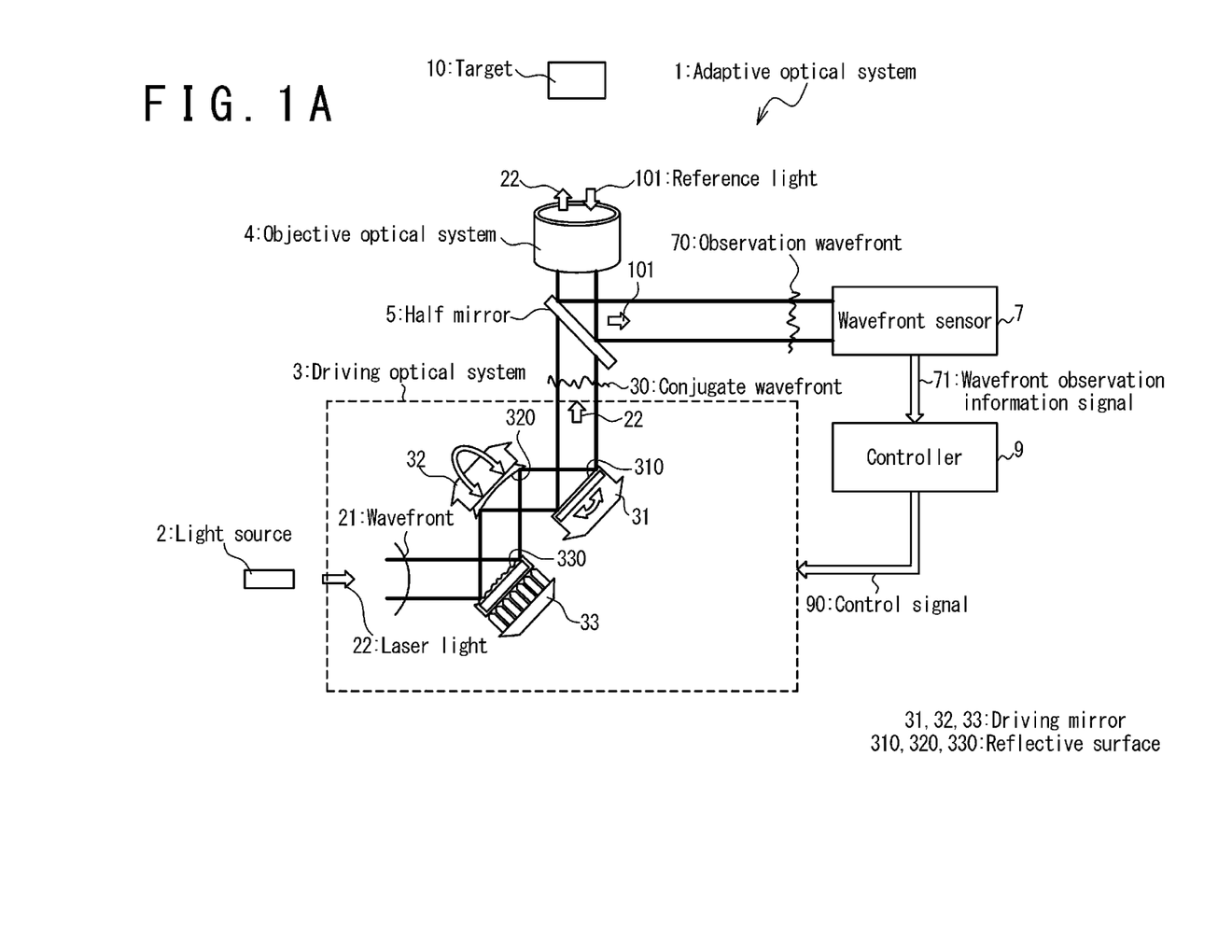
FIG. 1A is a diagram showing a configuration example of an adaptive optical system according to an embodiment.

By referring to FIG. 1A, an adaptive optical system 1 according to an embodiment will be explained. FIG. 1A is a diagram showing a configuration example of the adaptive optical system 1 according to an embodiment.

Components of the adaptive optical system 1 in FIG. 1A will be explained. The adaptive optical system 1 is provided with a light source 2, a driving optical system 3, an objective optical system 4, a half mirror 5, a wavefront sensor 7 and a controller 9. The driving optical system 3 is provided with a first driving mirror 31, a second driving mirror 32 and a third driving mirror 33. The first driving mirror 31 is provided with a first reflective surface 310 and a first driving device that is not illustrated. The second driving mirror 32 is provided with a second reflective surface 320 and a second driving device that is not illustrated. The third driving mirror 33 is provided with a third reflective surface 330 and a third driving device that is not illustrated.

Connection relationships between components in FIG. 1A will be explained. In the first driving mirror 31, the first driving device is connected to the first reflective surface 310 so as to be able to adjust an orientation of the first reflective surface 310. In the second driving mirror 32, the second driving device is connected to the second reflective surface 320 so as to be able to adjust a curved surface shape of the second reflective surface 320. In the third driving mirror 33, the third driving device is connected to the third reflective surface 330 so as to be able to adjust a curved surface shape of the third reflective surface 330.

Optical connection relationships between components in FIG. 1A will be explained. The light source 2, the third driving mirror 33, the second driving mirror 32, the first driving mirror 31 and the objective optical system 4 are optically connected in this order. Here, in an optical path in which laser light 22 emitted from the light source 2 goes to the target 10 via the driving optical system 3, the second driving mirror 32 is arranged downstream of the third driving mirror 33 and the first driving mirror 31 is arranged downstream of the second driving mirror 32.

In other words, the laser light 22 emitted from the light source 2 firstly reflects, when entering the driving optical system 3, at the third reflective surface 330 of the third driving mirror 33. The laser light 22 which has reflected at the third reflective surface 330 next reflects at the second reflective surface 320 of the second driving mirror 32. The laser light 22 which has reflected at the second reflective surface 320 next reflects at the first reflective surface 310 of the first driving mirror 31. The laser light 22 which has reflected at the first reflective surface 310 next passes through the half mirror 5, is emitted via the objective optical system 4, propagates in the atmosphere and is radiated to the target 10.

In addition, the objective optical system 4, the half mirror 5 and a light receiving section of the wavefront sensor 7 are optically connected in this order.

In other words, reference light 101 which reaches from the target 10 firstly propagates in the atmosphere, passes through the objective optical system 4 and then reflects at the half mirror 5. The reference light 101 which has reflected at the half mirror 5 next enters the light receiving section of the wavefront sensor 7.

Electric connection relationships between components in FIG. 1A will be explained. The wavefront sensor 7, the controller 9 and the driving optical system 3 are electrically connected.

More specifically, an output section of the wavefront sensor 7 and an input section of the controller 9 are electrically connected. That is, the wavefront observation information signal 71 that the wavefront sensor 7 generates is electrically transmitted and received between the wavefront sensor 7 and the controller 9. In addition, the control signal 90 that the controller 9 generates is electrically transmitted and received between the controller 9 and the first driving device, the second driving device and the third driving device.

Figure 1B:
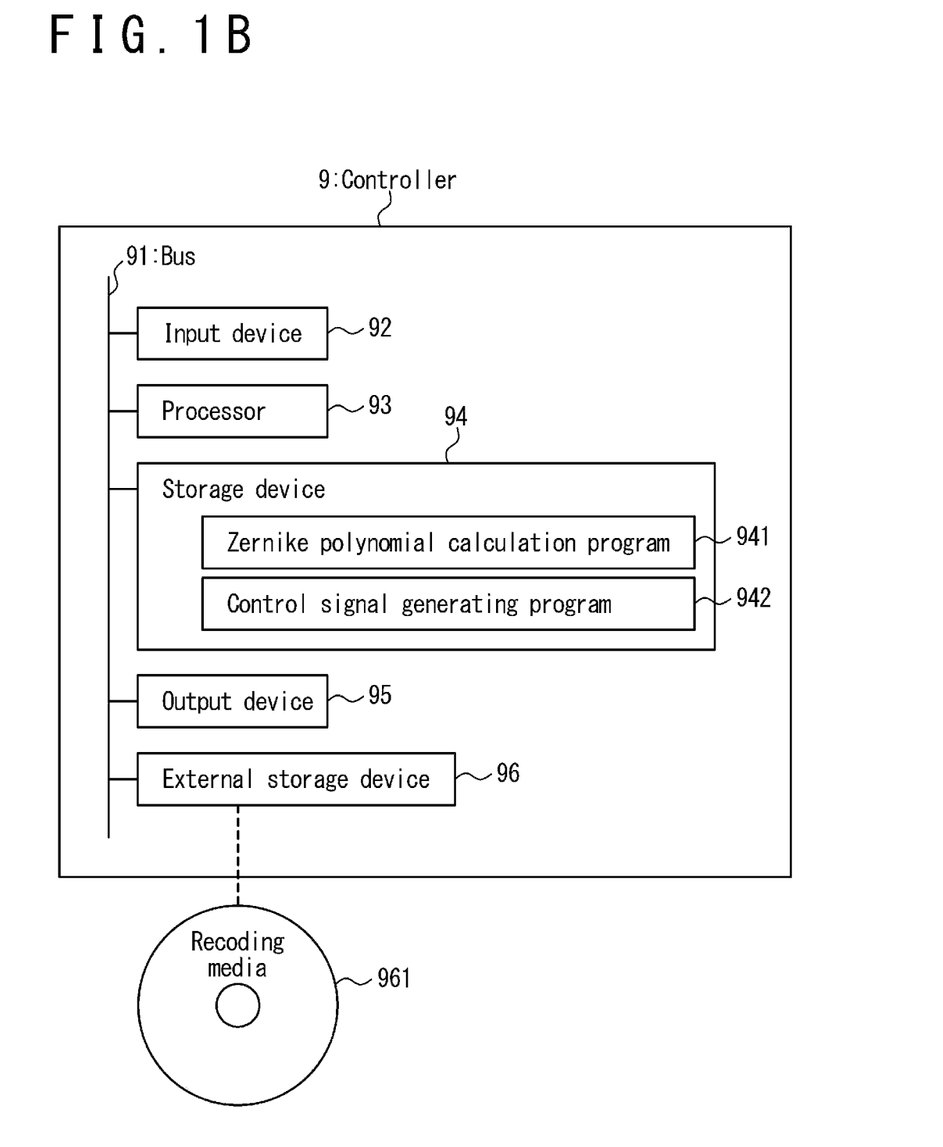
FIG. 1B is a block circuit diagram showing a configuration example of a controller according to an embodiment.

The adaptive optical system 1 according to an embodiment will be explained by referring to FIG. 1B. FIG. 1B is a block circuit diagram showing a configuration example of the controller 9 according to an embodiment.

Components of the controller 9 in FIG. 1B will be explained. The controller 9 is provided with a bus 91, an input device 92, a processor 93, a storage device 94, an output device 95 and an external storage device 96.

Connection relationships between components in FIG. 1B will be explained. The bus 91 is electrically connected to each of the input device 92, the processor 93, the storage device 94, the output device 95 and the external storage device 96. In other words, the input device 92, the processor 93, the storage device 94, the output device 95 and the external storage device 96 mutually transmit and receive electric signals via the bus 91.

The external storage device 96 performs writing and reading of data to/from a removable recording medium 961. It is preferable that the input device 92 is connected to the wavefront sensor 7 so as to be able to receive the wavefront observation information signal 71. It is preferable that the output device 95 is connected to the driving optical system 3 so as to be able to transmit the control signal 90.

Figure 2:
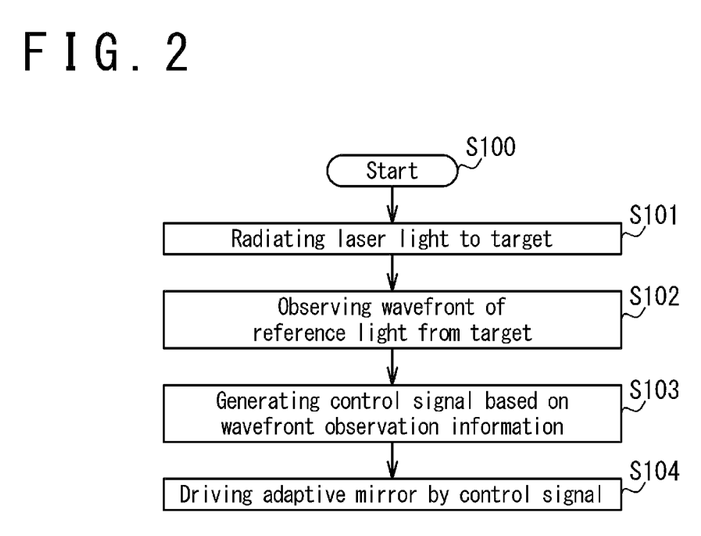
FIG. 2 is a flowchart showing a configuration example of an adaptive optical method according to an embodiment.

Operations of the adaptive optical system 1 according to an embodiment, that is, an adaptive optical method according to an embodiment will be explained by referring to FIG. 2. FIG. 2 is a flowchart showing a configuration example of an adaptive optical method according to an embodiment.

The flowchart in FIG. 2 includes a total of five steps from a zeroth step S100 to a fourth step S104. The flowchart in FIG. 2 starts from the zeroth step S100. The first step S101 will be executed next to the zeroth step S100.

In the first step S101, the adaptive optical system 1 radiates the laser light 22 to the target 10. In particular, firstly, the light source 2 generates the laser light 22. Here, it is favorable that, at a moment before entering the driving optical system 3, the wavefront 21 of the generated laser light 22 has a shape, such as spherical, planar or the like for example, which easily focuses when reaching the target 10. Next, it is preferable that positions and orientations of the driving optical system 3 and the objective optical system 4 are appropriately set in advance so that the generated laser light 22 reaches the target 10 via the driving optical system 3 and the objective optical system 4. This initial setting is intended for the laser light 22 to reach the target 10 to the last and an adaptive optics, which is an objective of the present embodiment, is not yet required to be performed. The second step S102 will be executed next to the first step S101.

In the second step S102, the wavefront sensor 7 observes the wavefront of the reference light 101 reaching from the target 10. Here, the observed wavefront will be referred to as observation wavefront 70 in order to distinguish from the wavefront 21. The observation wavefront 70 is affected by a fluctuation in the atmosphere existing between the objective optical system 4 and the target 10 and is disturbed.

It should be noted that the reference light 101 means the light reaching from the target 10 to the adaptive optical system 1. The reference light 101 may be reflected light which is laser light 22 generated by the light source 2 of the adaptive optical system 1, reflected at the target 10 and returned to the adaptive optical system 1, may be reflected light which is arbitrary light generated by other light source, reflected at the target 10 and reaching the adaptive optical system 1 and may be arbitrary light which is emitted by the target 10 itself and reaching the adaptive optical system 1.

The wavefront sensor 7 may be a Shack-Hartmann wavefront sensor for example. The Shack-Hartmann wavefront sensor receives light entered from outside via a plurality of lenses arranged in a plane to photograph a plurality of images formed by the plurality of lenses by use of one image sensor or the like. The Shack-Hartmann wavefront sensor can generate an electric signal indicating an observation result of the entered light by detecting arrangements of the plurality of photographed images. The wavefront sensor 7 observes the observation wavefront 70 and generates the wavefront observation information signal 71 indicating a result of this observation. The wavefront sensor 7 transmits the generated wavefront observation information signal 71 to the controller 9. The third step S103 will be executed next to the second step S102.

In the third step S103, the controller 9 generates the control signal 90 for controlling the driving optical system 3 in accordance with the received wavefront observation information signal 71.

The controller 9 may be a computer of which the processor 93 executes various instructions stored in the storage device 94 as a program, as shown in FIG. 1B. In this case, the controller 9 operates on one hand as a processor which executes a Zernike polynomial calculation program 941 to calculate the Zernike polynomial and on the other hand operates as a controller which executes a control signal generating program 942 to generate control signals as well.

Operations of the controller 9 which calculates the Zernike polynomial will be explained. It is preferable that the Zernike polynomial calculation program 941 is stored in the storage device 94 in advance. This Zernike polynomial calculation program 941 may be stored in the recording medium 961 in advance, for example, read out by the external storage device 96 and written to the storage device 94 via the bus 91.

The processor 93 reads out the Zernike polynomial calculation program 941 from the storage device 94 to execute. The processor 93 which executes the Zernike polynomial calculation program 941 receives the wavefront observation information signal 71 via the input device 92 and the bus 91. The received wavefront observation information signal 71 may be stored in the storage device 94.

The processor 93 calculates a Zernike polynomial which approximates a disturbance of the observation wavefront 70 that the received wavefront observation information signal 71 indicates. This approximation may be calculated by use of a least-square method for example.

The Zernike polynomial is an equation for decomposing a wavefront disturbance into components independent to each other and expressing each of the components as terms orthogonal to each other. Here, each term is expressed as a product of two variables to each of which an order is set and a coefficient. Such coefficients will be referred to as "Zernike coefficients" hereinafter. Calculating Zernike polynomial is equivalent to calculating a plurality of terms or a plurality of Zernike coefficients that are included in the Zernike polynomial.

Operations of the controller 9 generating the control signal 90 will be explained. It is favorable that the control signal generating program 942 is stored in the storage device 94 in advance. This control signal generating program 942 may be stored in the recording medium 961, read out by the external storage device 96 and written in the storage device 94 via the bus 91, for example.

The processor 93 reads out the control signal generating program 942 from the storage device 94 to execute. The processor 93 which executes the control signal generating program 942 reads out each Zernike coefficient stored in the storage device 94 and generates the control signal 90 in accordance with each of the Zernike coefficients which has been read out. All or a part of a plurality of the control signals 90 generated as above are/is simply and collectively referred to as control signals 90 as well.

More specifically, the controller 9 generates a first control signal corresponding to a first order Zernike coefficient, a second control signal corresponding to a second order Zernike coefficient and a third control signal corresponding to a third order Zernike coefficient as control signals 90.

The first order Zernike coefficient and the first control signal will be explained. The first order Zernike coefficient includes two components in fact. A first component of those two components is an inclination component in a first direction and a second component is an inclination component in a second direction. Here, the first direction is orthogonal to the optical axis direction. In addition, the second direction is orthogonal to the optical axis direction and is orthogonal to the first direction also.

The first control signal is generated in accordance with those two inclination components. That is, the first control signal is generated so that the inclination components of the first direction and the second direction of the disturbance of the observation wavefront 70 are corrected by the first driving mirror 31 which drives by the first control signal. Therefore, the first control signal may include two control signals in fact.

The first driving mirror 31 is provided with a first reflective surface 310 of which a surface is flat and is not deformable and a first driving device which inclines this first reflective surface 310. The first driving device may be provided with a first servomotor which inclines the first reflective surface 310 in the first direction and a second servomotor which inclines the first reflective surface 310 in the second direction. The first driving device inclines the first reflective surface 310 in response to the first control signal in a direction in which the first reflective surface 310 corrects an inclination component of the disturbance of the observation wavefront 70. The first driving mirror 31 may be a tip tilt mirror which operates as above, for example.

The second order Zernike coefficient and the second control signal will be explained. The second order Zernike coefficient includes three components in fact. Among those three components, a first component is a first astigmatism component in the first direction and the second direction, the second component is a focus shift component and the third component is a second astigmatism component in a third direction and a fourth direction. Here, the third direction is orthogonal to the optical axis direction and intersects the first direction and the second direction at 45 degrees. The fourth direction is orthogonal to the optical axis direction and is orthogonal to the third direction too.

The second control signal is generated in accordance with the focus shift component. That is, the second control signal is generate so that the focus shift component of the disturbance of the observation wavefront 70 is corrected by the second driving mirror 32 which drives by the second control signal.

The second driving mirror 32 may be a bimorph deformable mirror for example. A bimorph deformable mirror is configured so that a curved surface shape of a reflective surface thereof deforms by expansion and contraction of a plurality of piezoelectric elements. Here, the plurality of piezoelectric elements is arranged in parallel to a plane parallel to a direction of expansion and contraction in accordance with applied voltages. However, among the plurality of piezoelectric elements, a part is arranged at a front side of the reflective surface and a rest is arranged at a back side of the reflective surface. The bimorph deformable mirror is able to adjust a focal length of an optical system including itself by applying voltages so that expansion and contraction of the piezoelectric elements are reversed on the front side and the back side of the reflective surface. In this way, the second driving mirror 32 is able to control a focal length of the entire driving optical system 3 including the second driving mirror 32 itself and further a focal length of the entire adaptive optical system 1 including this driving optical system 3.

It should be noted that the first astigmatism component and the second astigmatism component among the second order Zernike coefficients may be corrected by the second driving mirror 32 together with the focus shift component. In this case, the second control signal is generated in accordance with the first astigmatism component and the second astigmatism component too, in addition to the focus shift component. Alternatively, the first astigmatism component and the second astigmatism component may be corrected by the third driving mirror 33 that will be described later.

The third order Zernike coefficient and the third control signal will be explained. The third Zernike coefficient includes four components in fact. Those four components include a third order coma aberration component in the first direction, a third order coma aberration component in the second direction and the like.

The third control signal is generated in accordance with each component of the third order Zernike coefficient. That is, the third control signal is generated so that the components corresponding to the third order Zernike coefficient of the disturbance of the observation wavefront 70 are corrected by the third driving mirror 33 which drives by the third control signal.

The third driving mirror 33 may be a face sheet deformable mirror for example. A face sheet deformable mirror is configured so that a curved surface shape of the reflective surface thereof is deformed by a plurality of piezoelectric elements. Here, the plurality of piezoelectric elements is arranged in a direction of a plane orthogonal to a direction of expanding and contracting in response to applied voltages.

It should be noted that in a case of correcting the first astigmatism component and the second astigmatism component by the third driving mirror 33, the third control signal is generated in accordance with the first astigmatism component and the second astigmatism component among the second order Zernike coefficient in addition to each component of the third Zernike coefficient, too.

The fourth step S104 is executed next to the third step S103.

In the fourth step S104, the first driving mirror 31, the second driving mirror 32 and the third driving mirror 33 drive by the first control signal, the second control signal and the third control signal, respectively.

That is, the first driving device of the first driving mirror 31 drives by the first control signal and adjusts the orientation of the first reflection surface 310 of the first driving mirror 31 to correct the inclination component indicated by the first order Zernike coefficient of the disturbance of the observation wavefront 70.

Similarly, the second driving device of the second driving mirror 32 drives by the second control signal and adjusts a curved surface shape of the second reflective surface 320 of the second driving mirror 32 and adjusts a focal length of the driving optical system 3, to correct the focus shift component indicated by the second order Zernike coefficient of the disturbance of the observation wavefront 70.

Similarly, the third driving device of the third driving mirror 33 drives by the third control signal and adjusts the curved surface shape of the third reflective surface 330 of the third driving mirror 33 so as to correct the third order component indicated by the third order Zernike coefficient of the disturbance of the observation wavefront 70.

As a result, the wavefront of the laser light 22 emitted from the driving optical system 3 to the target 10 will have a shape having a conjugate relationship to the observation wavefront 70. This wavefront will be referred to as conjugate wavefront 30 for distinction. Here, a conjugate relationship means that a wavefront of a spherical surface or a plane is combined by combining two wavefronts. Therefore, when the laser light 22 that has the conjugate wavefront 30 reaches the target 10 via the objective optical system 4 and the atmosphere, the laser light 22 converges in an ideal state of having a wavefront 21 of a spherical surface or a plane that the laser light 22 had when emitted by the light source 2, by influence of the atmosphere fluctuation.

In other words, in a case where the wavefront 21 of a spherical surface or a plane that the laser light 22 has changes to the observation wavefront 70 by the atmosphere fluctuation when the laser light 22 reaches the target 10, generating the conjugate wavefront 30 in conjugate relationship with this observation wavefront 70 by use of the driving optical system 3 makes it possible to make the laser light 22 which has this conjugate wavefront 30 to have a wavefront 21 of a spherical surface or a plane when reaching the target 10.

By performing operations as above, the adaptive optical system 1 according to the present embodiment can compensate the wavefront disturbance of the laser light 22 due to the atmosphere fluctuation.

It should be noted that since the atmosphere fluctuation varies with time it is favorable to repeatedly execute the second step S102 to the fourth step S104 even after the fourth step S104 is completed. In this sense, the flowchart in FIG. 2 may be executed again from the second step S102 next to the fourth step S104.

In addition, there may be a case where the laser light 22 radiated in order to obtain the reference light 101 is different from the laser light 22 for achieving the original objective, in a viewpoint of the intensity or the like. In this sense, the flowchart in FIG. 2 may be executed again from the first step S101 next to the fourth step S104, after changing generations conditions of the laser light 22. In addition, although the reference light is received via the objective optical system 4, the reference light may be received via an optical system provided separately from the objective optical system 4 and provided to the wavefront sensor. In this case half mirrors may be omitted.

Second Embodiment

As described above, the atmosphere fluctuation varies with time. On the other hand, there is a physical limit in driving speed of driving mirrors. Therefore, it may be considered a case where the atmosphere fluctuation changes so quickly that each driving mirror, especially the third driving mirror 33, cannot drive in time. This is because in Zernike polynomial, the higher the order of term is, the more complex the curved surface shape is that the reflective surface of the deformable mirror should have in order to correct wavefront disturbance corresponding to the term. In other words, this is because a resolution required to the reflective surface of each driving mirror, loads of driving devices and the like increase and consequently correction accuracy decreases.

In general, in the Zernike polynomial, the lower the order of term is, the larger a proportion of influence to corresponding wavefront disturbance is. Therefore, it is favorable that the first driving mirror 31 controlled in accordance with the first order Zernike coefficient and the second driving mirror 32 controlled in accordance with the second order Zernike coefficient are driven with priority over the third driving mirror 33 controlled in accordance with the third order Zernike coefficient, in a viewpoint of maximizing correction amount of the driving optical system 3. It should be noted that, it is favorable for a similar reason that the lower the order of the Zernike coefficient in accordance with which a driving mirror is controlled is, the more downstream of the optical path from the light source 2 to the target 10 the driving mirror is arranged.

Therefore, in the present embodiment, a modification is added to the method of generating the third control signal in the first embodiment so as to decrease a driving amount of the third driving mirror 33 in accordance with an amount of the changing speed of the atmosphere fluctuation. In particular, a total number of Zernike coefficients to actually calculate, among Zernike coefficients of third order and more to be calculated as the Zernike polynomial, is increased or decreased in accordance with the changing speed of the illuminance of the reference light 101. This is because a sufficiently significant correlation is observed between the changing speed of the atmosphere fluctuation and the changing speed of the illuminance of the reference light 101 passing through this atmosphere. Here, the illuminance of light has a meaning similar to the intensity of the light seen from the observation side.

Figure 3A:
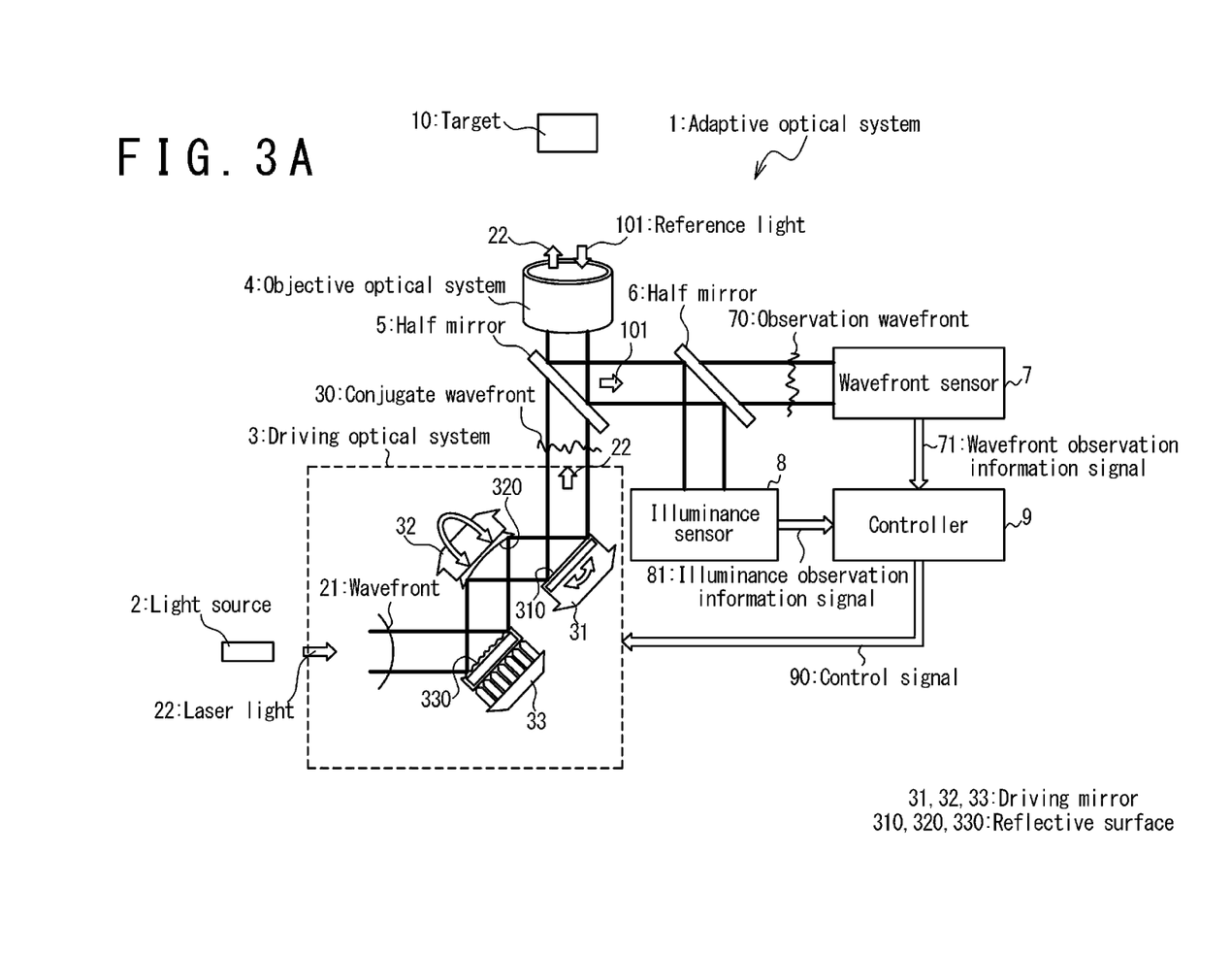
FIG. 3A is a diagram showing a configuration example of an adaptive optical system according to an embodiment.

An adaptive optical system 1 according to an embodiment will be explained by referring to FIG. 3A. FIG. 3A is a diagram showing a configuration example of the adaptive optical system 1 according to an embodiment.

The adaptive optical system 1 in FIG. 3A is equivalent to the adaptive optical system 1 in FIG. 1A added with a half mirror 6 and an illuminance sensor 8. Parts of the configuration of the adaptive optical system 1 in FIG. 3A which are different from FIG. 1A will be mainly explained.

Optical connection relationships of the half mirror 6 and the illuminance sensor 8 with other components will be explained. The half mirror 6 is arranged between the half mirror 5 and the wavefront sensor 7. That is, a part of the reference light 101 that is reflected by the half mirror 5 reflects at the half mirror 6 and enters the illuminance sensor 8, while a remaining part of the reference light 101 passes through the half mirror 6 and enters the wavefront sensor 7.

Electric connection relationships between the illuminance sensor 8 and other components will be explained. An output of the illuminance sensor 8 is connected to an input of the controller 9. In particular, illuminance observation information signal 81 that the illuminance sensor 8 generates is electrically transmitted and received between the illuminance sensor 8 and the controller 9. Here, the illuminance observation information signal 81 is a signal indicating a result of an observation, performed by the illuminance sensor 8, of the illuminance of the reference light 101 which enters the illuminance sensor 8.

Further detailed explanation of other configurations in FIG. 3A will be omitted because it is similar to the case of FIG. 1A.

Figure 3B:
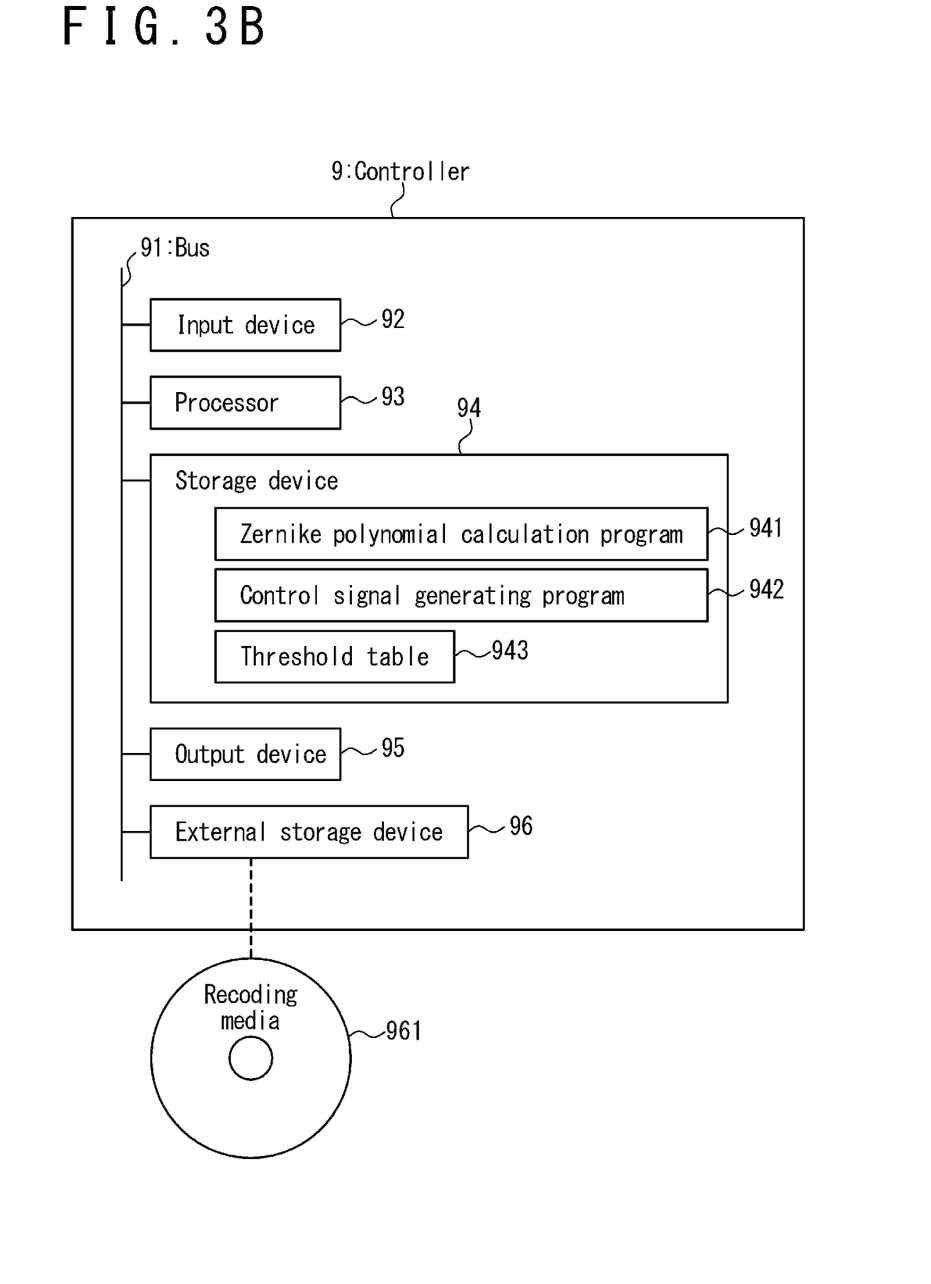
FIG. 3B is a block circuit diagram showing a configuration example of a controller according to an embodiment.

A configuration of the controller 9 according to an embodiment will be explained by referring to FIG. 3B. FIG. 3B is a block circuit diagram showing a configuration example of the controller 9 according to an embodiment.

The controller 9 in FIG. 3B is equivalent to the controller 9 in FIG. 1B added with a threshold table 943. The threshold table 943 is stored in the storage device 94. This threshold table 943 may be stored in the recording medium 961 in advance, read out by the external storage device 96 and written to the storage device 94 via the bus 91, for example.

The threshold table 943 is provided with a data indicating a specific threshold value. This threshold value is, as described later, a threshold value used to compare the changing speed of the intensity of the reference light 101 and the driving speed of the third driving device in the third driving mirror 33 in a viewpoint of the total number of terms in the Zernike polynomial. The threshold table 943 may include a plurality of such threshold values.

Figure 4:
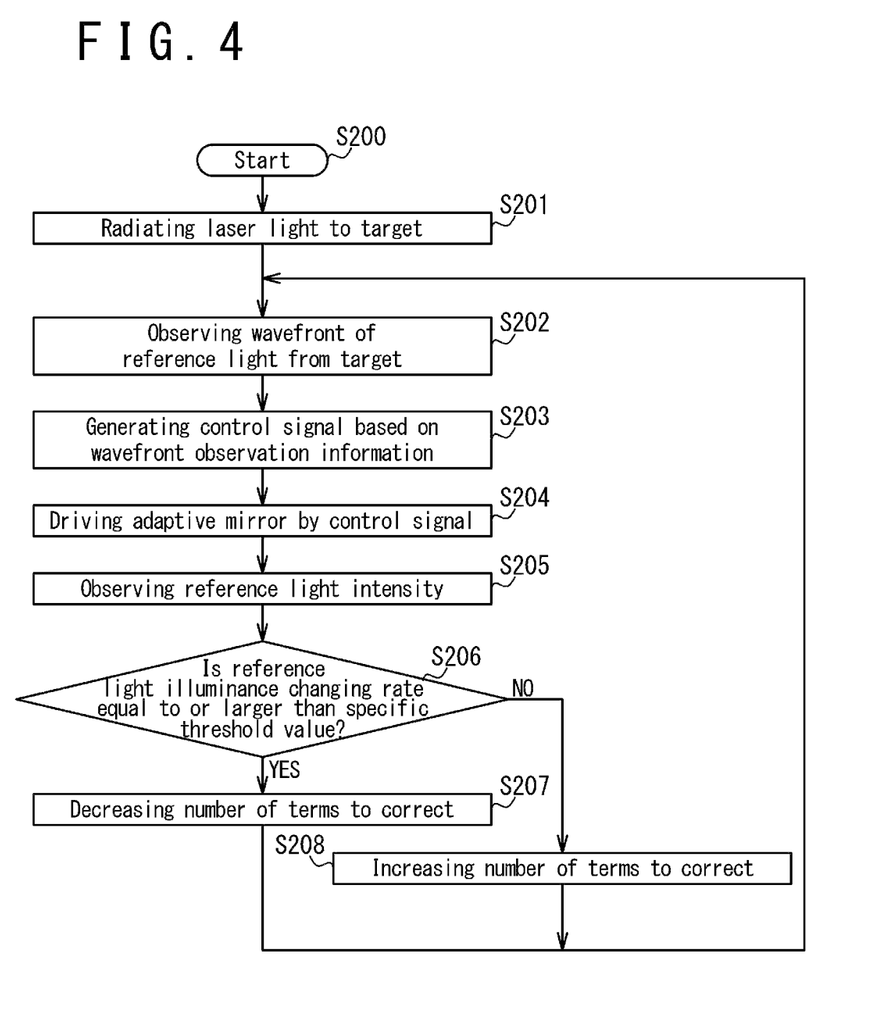
FIG. 4 is a flowchart showing a configuration example of an adaptive optical method according to an embodiment.

Operations of the adaptive optical system 1 according to an embodiment, that is, an adaptive optical method according to an embodiment, will be explained by referring to FIG. 4. FIG. 4 is a flowchart showing a configuration example of an adaptive optical method according to an embodiment. The flowchart in FIG. 4 is provided with a total of nine steps from a zeroth step S200 to an eighth step S208. The flowchart in FIG. 4 starts by the zeroth step S200. The first step S201 will be executed next to the zeroth step S200.

In the first step S201, the adaptive optical system 1 radiates the laser light 22 to the target 10. Further detailed explanation will be omitted because the first step S201 in FIG. 4 is similar to the first step S101 in FIG. 2. The second step S202 will be executed next to the first step S201.

In the second step S202, the wavefront sensor 7 observes the observation wavefront 70 of the reference light 101 reaching from the target 10. Further detailed explanation will be omitted because the second step S202 in FIG. 4 is similar to the second step S102 in FIG. 2. The third step S203 will be executed next to the second step S202.

In the third step S203, the controller 9 generates the control signal 90 for controlling the driving optical system 3 in accordance with the received wavefront observation information signal 71. The third step S203 in FIG. 4 is approximately similar to the third step S103 in FIG. 2 and different in the following points. That is, as described later, the controller 9 performs a comparison between the illuminance observation information signal 81 and the threshold value in the threshold table 943 and increases or decreases, in accordance to a result of this comparison, the total number of Zernike coefficients that the controller 9 calculates by executing the Zernike polynomial calculation program 941. As a result, a content of the third control signal generated in accordance with Zernike coefficients of third order and more also will change. The fourth step S204 will be executed next to the third step S203.

In the fourth step S204, the first driving mirror 31, the second driving mirror 32 and the third driving mirror 33 drive by the first control signal, the second control signal and the third control signal, respectively. Further detailed explanation will be omitted because the fourth step S204 in FIG. 4 is similar to the fourth step S104 in FIG. 2. The fifth step S205 will be executed next to the fourth step S204.

In the fifth step S205, the illuminance sensor 8 observes the intensity of the reference light 101. In particular, the illuminance sensor 8 observes the changing speed of the illuminance of the reference light 101 and generates the illuminance observation information signal 81 indicating a result of this observation. The generated illuminance observation information signal 81 is transmitted to the controller 9. The sixth step S206 is executed next to the fifth step S205.

In the sixth step S206, the controller 9 performs a comparison between a changing speed of the intensity of the reference light 101 and the threshold value stored in the storage device 94. Here, the controller 9 reads out the changing speed of the intensity of the reference light 101 from the illuminance observation information signal 81 received from the illuminance sensor 8. In addition, the controller 9 reads out the threshold value as a comparison target from the threshold table 943 stored in the storage device 94.

It is favorable that the threshold value in the threshold table 943 is calculated in advance in accordance with the driving speed of the third driving device in the third driving mirror 33. That is, it is favorable to prepare, by actual measurements and/or theoretical calculations in advance, a list of combinations concerning what is a range in which the changing speed of the intensity of the reference light 101 should be included and how many should be the terms of the Zernike polynomial in accordance with which the third control signal is generated so that the third driving device can drive in accordance with the third control signal, and store a threshold value indicating those combinations in the storage device 94 in advance. Therefore, it is favorable that a plurality of threshold values are prepared in the threshold table 943 as targets of comparison with the changing speed of the intensity of the reference light 101.

As a result of the comparison, in a case where the changing speed of the intensity of the reference light 101 is larger than the threshold value (YES), the seventh step S207 will be executed next to the sixth step S206. In an opposite case (NO), the eighth step S208 will be executed next to the sixth step S206.

In the seventh step S207, the controller 9 decreases the number of terms to correct among the plurality of Zernike coefficients. However, in view of a necessary minimum correction capability required to the driving optical system 3, it is favorable that the number of terms to correct is controlled so as not to exceed a specific lower limit. For example, it is favorable that a specific lower limit value is prepared to the number of terms to correct so that at least the first control signal for driving the first driving mirror 31 and the second control signal for driving the second driving mirror 32 are generated. The flowchart in FIG. 4 is executed again from the second step S202 next to the seventh step S207. It should be noted that in a case where the laser light 22 radiated in the first step S201 to obtain the reference light 101 is different from the laser light 22 for achieving the original purpose, the flowchart in FIG. 4 may be executed again from the first step S201 next to the seventh step S207, after changing conditions of the light source 2 to generate the laser light 22.

In the eighth step S208, the controller 9 increases the number of the terms to correct among the plurality of Zernike coefficients. However, in view of a limit of processing power of the processor 93, it is favorable to control the number of the terms to correct so as not to exceed a specific higher limit. The flowchart in FIG. 4 will be executed again from the second step S202 next to the eighth step S208. It should be noted that in a case where the laser light 22 radiated in the first step S201 in order to obtain the reference light 101 is different from the laser light 22 for achieving the original purpose, the flowchart in FIG. 4 may be executed again from the first step S201 next to the eighth step S208 after changing conditions of the light source 2 to generate the laser light 22.

By operating as above, the adaptive optical system 1 according to the present embodiment can reduce a load of driving mirrors, improve correction speed and maximize correction effect.

Third Embodiment

In Zernike polynomials, the higher the order of a term is, the more complex the corresponding wavefront disturbance component is and the more complex a curved surface shape of a driving mirror which corrects this wavefront disturbance component is too. Therefore, if it is tried to correct a wavefront disturbance component in which a plurality of high order terms are combined by a single driving mirror, similarly to the third driving mirror 33 in the first embodiment and the second embodiment, a curved surface shape for correcting this combined wavefront disturbance component will become more complex and a load of the third driving device will become larger.

Figure 5:
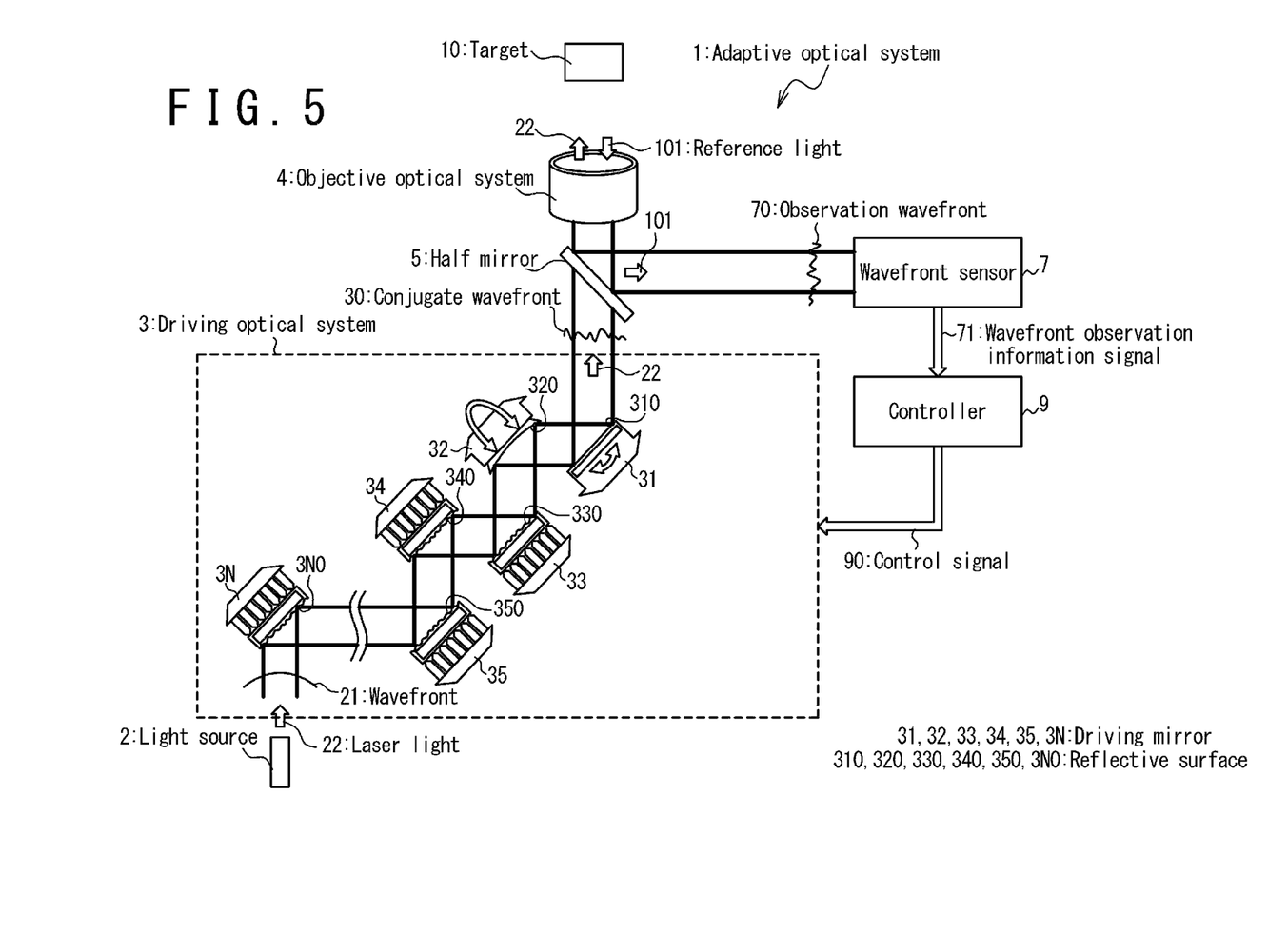
FIG. 5 is a diagram showing a configuration example of an adaptive optical system according to an embodiment.

Therefore, in the present embodiment, a plurality of disturbance components of the disturbance of the observation wavefront 70 respectively corresponding to a plurality of Zernike coefficients of third order and more are corrected by a plurality of driving mirrors 33 to 3N of third order and more, respectively. In other words, in the present embodiment, a total number of driving mirrors is larger than three. The controller generates control signals in accordance with that.

An adaptive optical system 1 according to an embodiment will be explained by referring to FIG. 5. FIG. 5 is a diagram showing a configuration example of an adaptive optical system 1 according to an embodiment.

The adaptive optical system 1 in FIG. 5 is equivalent to the adaptive optical system 1 in FIG. 1A added with a fourth driving mirror 34, a fifth driving mirror 35 and an N-th driving mirror 3N. Here, N is an arbitrary integer and there may further be driving mirror(s) of which illustration is omitted between the fifth driving mirror 35 and the N-th driving mirror 3N.

The fourth driving mirror 34 to the N-th driving mirror 3N are configured similarly to the third driving mirror 33 and each driving mirror is provided with a reflective surface and a driving device. That is, the fourth driving mirror 34 is provided with a fourth reflective mirror 340 and a driving device that is not illustrated, the fifth driving mirror 35 is provided with a fifth reflective mirror 350 and a driving device that is not illustrated and the N-th driving mirror 3N is provided with an N-th reflective surface 3N0 and a driving device that is not illustrated.

Operations of the adaptive optical system 1 according to the present embodiment are different from the case of the first embodiment shown in FIG. 2 in a point that total numbers of driving mirrors, control signals 90 and Zernike coefficients to calculate are increased, and similar in other points; therefore further detailed explanation will be omitted.

According to the present embodiment, by preparing a plurality of driving mirrors which correspond to a plurality of high order Zernike coefficients by one-to-one, the load for adjusting the curved surface shape of the reflecting surface of each driving mirror can be reduced. As a result, correcting speed improves.

The invention made by inventor(s) has been explained above in detail and in accordance with embodiments; however, the present invention of course is not limited to the previously described embodiments and various modifications can be made within a scope of not departing from the spirit of the invention. In addition, each feature explained in the previously described embodiments can be combined freely as long as there is no technical contradiction.

It should be noted that the present application is based on the Japanese patent application 2017-145310 filed on Jul. 27, 2017 and claims treaty priority thereof. All the disclosure thereof is herein incorporated by reference.

The invention claimed is:

1. An adaptive optical system comprising:
a wavefront sensor configured to observe a wavefront of a reference light received from a target and generate a wavefront observation information signal indicating an observation result of the wavefront;
a controller configured to calculate a Zernike polynomial on a basis of the wavefront observation information signal and generate m control signals (m is an integer) on a basis of a plurality of Zernike coefficients up to n-th order in the calculated Zernike polynomial, wherein n is an integer equal to or more than three and m satisfies n≥m≥3;
a light source configured to generate laser light; and
an optical system configured to receive the laser light from the light source to optically process so that the laser light has a conjugate wavefront to the wavefront of the reference light in response to the m control signals from the controller and emit the processed laser light to the target,
wherein two among the m control signals are a first control signal and a second control signal generated on a basis of a first order Zernike coefficient and a second order Zernike coefficient, respectively.

2. The adaptive optical system according to claim 1,
wherein the controller is further configured to generate the first control signal, the second control signal and a third control signal,
wherein the optical system includes a driving optical system comprising a first driving mirror, a second driving mirror and a third driving mirror configured to optically process the laser light in response to the first control signal, the second control signal and the third control signal.

3. The adaptive optical system according to claim 2,
wherein the first driving mirror has a first reflective plane surface and is configured to change an orientation of the first reflective plane surface in response to the first control signal,
wherein the second driving mirror has a second reflective surface which is deformable and is configured to change a curved surface shape of the second reflective surface in response to the second control signal to adjust a focal length of the driving optical system, and
wherein the third driving mirror has a third reflective surface which is deformable and is configured to deform a curved surface shape of the third reflective surface in response to the third control signal.

4. The adaptive optical system according to claim 1,
wherein the controller generates (k−1) control signals in response to Zernike coefficients of up to (k−1)-th order, wherein k satisfies m≥k≥3, and generates a k-th control signal in response to Zernike coefficients up to (n−(k−1))-th order.

5. The adaptive optical system according to claim 4,
wherein the driving optical system comprises driving mirrors of first to k-th order,
wherein the laser light is provided to the k-th driving mirror,
wherein the laser light being processed is emitted from the k-th driving mirror and is provided to a (k−1)-th driving mirror,
wherein the laser light being processed is emitted from the first driving mirror and is emitted to the target via the optical system as the processed laser light.

6. The adaptive optical system according to claim 1,
wherein the reference light is provided to the wavefront sensor via the optical system.

7. The adaptive optical system according to claim 1 further comprising:
an illuminance sensor configured to observe an illuminance of the reference light and generate an illuminance observation information signal indicating an observation result of the illuminance; and
a storage device configured to store a plurality of threshold values,
wherein the controller performs a comparison between a rate of change of an illuminance indicated by the illuminance observation information signal and the plurality of the threshold values and increases and/or decreases a total number of the Zernike coefficients to calculate among the plurality of Zernike coefficients in response to a result of the comparison.

8. An adaptive optical method comprising:

performing observation of a wavefront of reference light reached from a target;

generating a wavefront observation information signal indicating a result of the observation;

calculating a Zernike polynomial on a basis of the wavefront observation information signal;

generating m control signals (m is an integer) on a basis of Zernike coefficients of up to n-th order of the calculated Zernike polynomial, wherein n is an integer equal to or more than three and m satisfies $n \geq m \geq 3$;

generating laser light; and optically processing the laser light so that the laser light has a conjugate wavefront to the wavefront of the reference light in response to the m control signals and emitting the processed laser light to the target, wherein two among the m control signals are a first control signal and a second control signal generated on a basis of a first order Zernike coefficient and a second order Zernike coefficient, respectively.

* * * * *